(12) United States Patent
Wadensten

(10) Patent No.: US 7,458,547 B1
(45) Date of Patent: Dec. 2, 2008

(54) EXPANDABLE BRACKET ASSEMBLY FOR A REMOVABLE CAR SHAKER

(76) Inventor: Theodore S. Wadensten, P.O. Box 8, 75 Stillson Rd., Wyoming, RI (US) 02898

(*) Notice: Subject to any disclaimer, the term of this patent is extended or adjusted under 35 U.S.C. 154(b) by 206 days.

(21) Appl. No.: 11/498,224

(22) Filed: Aug. 2, 2006

(51) Int. Cl.
*E04G 5/06* (2006.01)

(52) U.S. Cl. .......................... 248/222.14; 248/223.41; 248/562; 414/375

(58) Field of Classification Search ............ 248/222.14, 248/223.41, 225.11, 229.11, 560, 562, 563, 248/566, 567, 568; 414/375, 809; 267/140.4, 267/14, 141.1, 140.11
See application file for complete search history.

(56) References Cited

U.S. PATENT DOCUMENTS

| | | | |
|---|---|---|---|
| 3,003,733 A | 10/1961 | Peterson | |
| 3,463,431 A | 8/1969 | Matson | |
| 5,636,826 A * | 6/1997 | Nakagaki et al. | ............ 248/562 |
| 5,833,205 A * | 11/1998 | Lindbeck | .................... 248/671 |
| 6,058,588 A | 5/2000 | Wadensten | |
| 7,195,217 B1 * | 3/2007 | Wadensten | ............. 248/223.41 |

* cited by examiner

Primary Examiner—Anita M King
(74) Attorney, Agent, or Firm—Patrick J Pinto

(57) ABSTRACT

An expandable vibrator bracket for attaching a car-shaker vibrator to a female receptacle attached to a railroad car to be vibrated. The expandable bracket includes: a vibrator mounting member, a leg member, and a wedge base member. The vibrator mounting member supports the vibrator. The wedge base member further includes a first end, a second end, a first side, and a second side. The wedge plate includes an attaching end, a distal end, an interior side and an exterior side. The attaching end is coupled to the first end of the wedge base member for allowing the distal end to selectively move with respect to the second end of the wedge base member when acted upon by a spreading or expanding force. The second side of the wedge base member and the exterior side of the wedge plate simultaneously abut opposite interior surfaces of the female receptacle during selective urging by the spreading force for holding the expandable vibrator bracket in the female receptacle. The spreading force may include a linear type of wedge, a rotary wedge, springs. The subsequent removal of the spreading or expanding force allows for the removal of the collapsed vibrator bracket from the female receptacle.

20 Claims, 4 Drawing Sheets

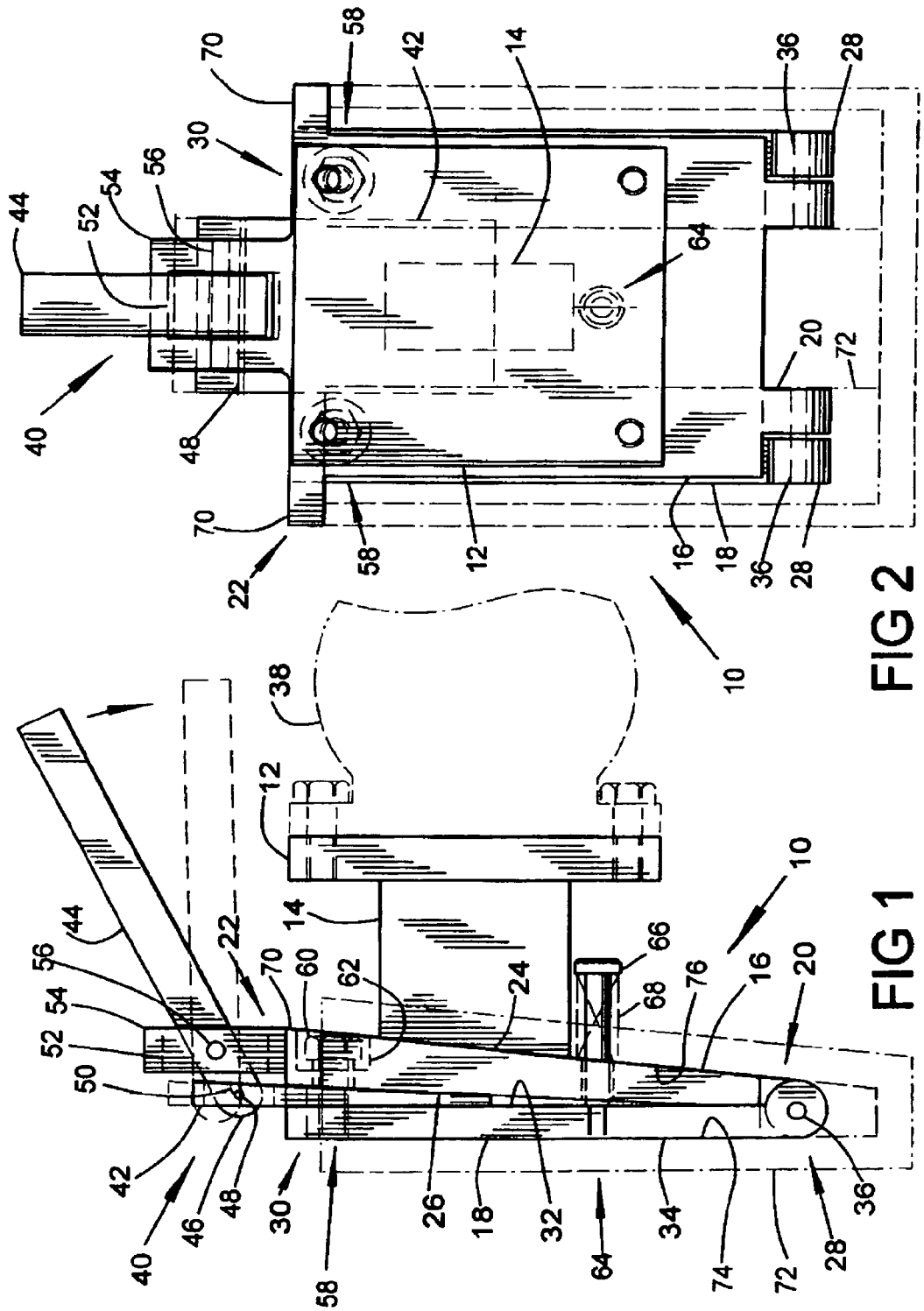

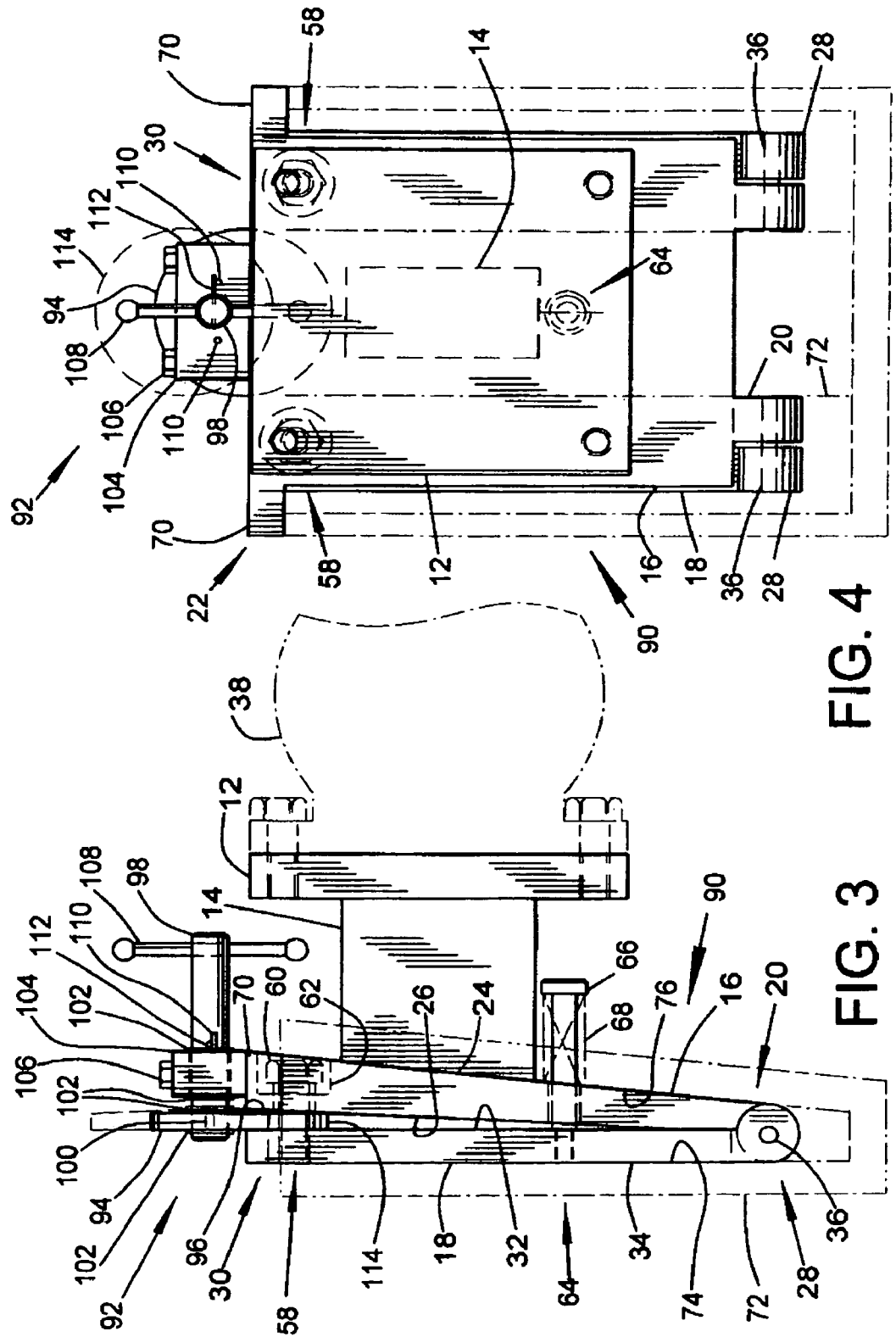

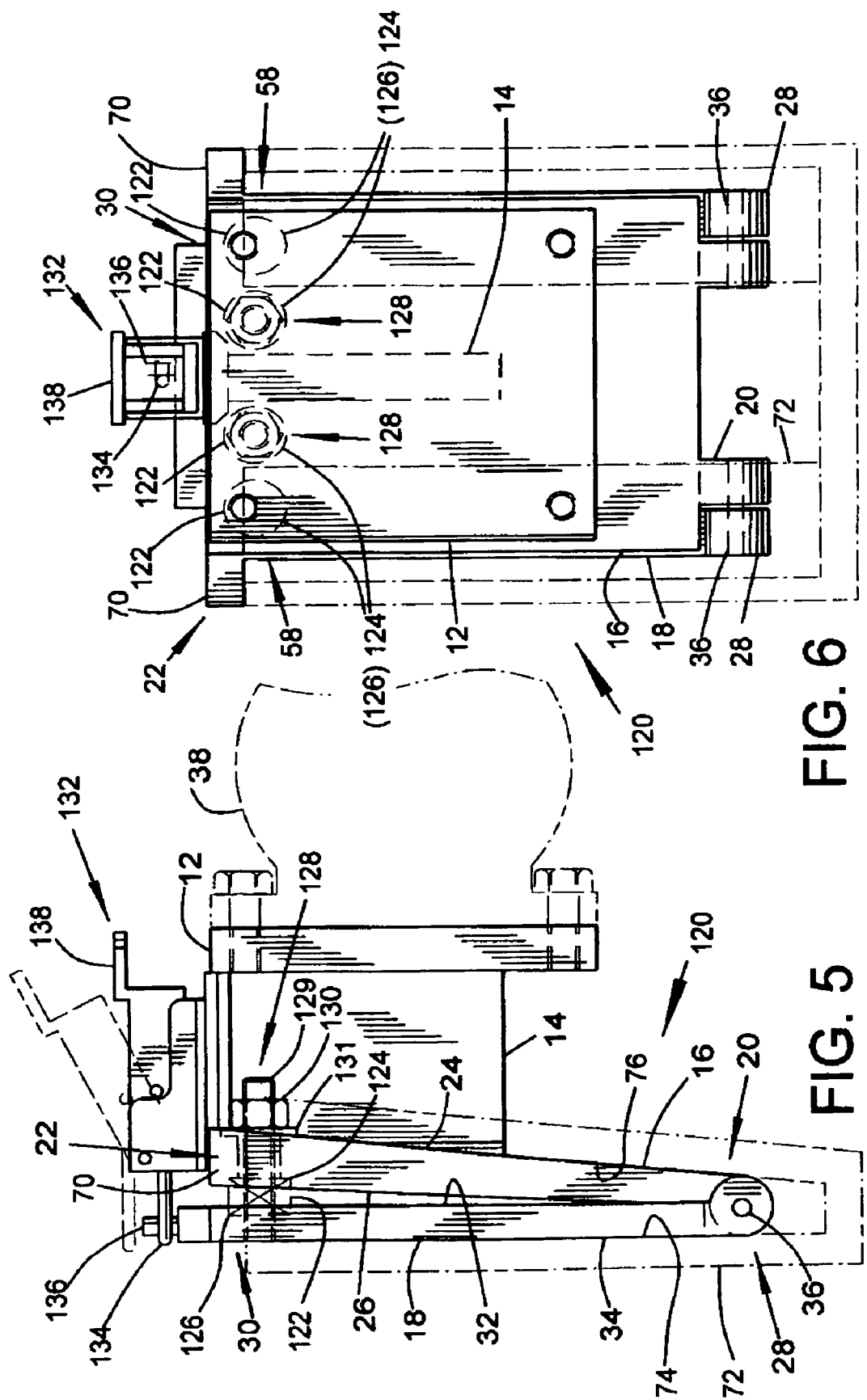

EXPANDABLE BRACKET ASSEMBLY FOR A REMOVABLE CAR SHAKER

CROSS REFERENCE TO RELATED APPLICATION

Not Applicable

STATEMENT REGARDING FEDERALLY SPONSORED RESEARCH OR DEVELOPMENT

Not Applicable

BACKGROUND OF THE INVENTION

1. Field of the Invention

With regard to the classification of art, this invention is believed to be found in the general class for Supports and more particularly to those subclasses pertaining to the removable mounting of a car shaker vibrator to a railroad car.

2. Description of Related Art

Railroad hopper cars are used to transport various types of material such as; coal, cement, chemicals, flour, grains and the like. Usually, transporting the material from one site to another results in compaction thereof. After compaction, the materials generally are jammed and do not flow easily upon the opening of the hopper car discharge gate or gates. Generally a car-shaker vibrator is removably attached to the railroad hopper car for breaking loose the jammed material and maintaining its flow until the car is nearly emptied. Removable or detachable vibratory railroad car shaker apparatus are known in the field. Exemplary brackets and tools for the removable mounting of a vibrator to a railroad car are disclosed in U.S. Pat. No. 3,003,733 that issued to Petersen on Oct. 10, 1961; U.S. Pat. No. 3,463,431 that issued to Matson on Aug. 26, 1969; and U.S. Pat. No. 6,058,588 that issued to Wadensten on May 9, 2000. These patents disclose a common type of separable male/female bracket arrangement. Usually the female portion of the bracket is attached to a hopper portion of a railroad car. This type of bracket is sometimes referred to as a Gardner or Tyler type and generally has a C-shaped seat or pocket portion (i.e. a wedge, dovetail or the like.) The male portion generally may be characterized as a T-shape that has a blade member (i.e. male wedge, male dovetail or the like) and a reduced connector portion (i.e. web, neck, leg and the like). U.S. Pat. No. 3,003,733 also discloses a wedge shaped tool for separating the male portion from the female portion of the bracket. U.S. Pat. No. 3,463,431 discloses a threaded means for retaining the male portion of the bracket in the female portion of the bracket. U.S. Pat. No. 6,058,588 that issued to the present inventor and is solely owned by him discloses a tool that may be employed for releasing the wedge from the female portion or half.

There must be a close fit between the male portion and the female portion in order for the vibrator to work effectively and efficiently. As previously mentioned above, the female portion of the bracket is usually fixed to the railroad car by a suitable means such as welding and the like and therefore remains with the railroad car as it is moved to various yards, unloading sites or locations. Whereas, the vibrator and the male half of the bracket should remain at a particular site for unloading the railroad car. It can be appreciated that in use, the female portion of the bracket and the male portion may not be exactly mated because they come from different bracket manufacturers, car shaker manufactures and/or in fact one or both of the parts of the bracket may be worn or oxidized. Any looseness in the connection will not allow the full vibratory force to be transmitted into the hopper car. Furthermore excessive looseness will most likely result in further wear of the male portion and/or the female portion. It is probably not desirable or economically feasible to remove all the hopper cars with worn brackets from service to repair or replace the female portion of the bracket.

Another problem that may occur is that if the crew is unsuccessful in removing the vibrator and the male bracket from the car, the vibrator and the male bracket will then travel with the railroad car to a new location. The work gang or crew may or may not have a spare vibrator to attach to another railroad car to be unloaded. The work gang may never see the vibrator again. Any permanent loss of the vibrator results in a loss of inventory and money. Permanent or temporary loss of a vibrator requires that spare vibrators be on hand thereby adding to operating costs.

It has been determined that there is still a need to provide a male bracket assembly that is useable with various types of vibrators and with a variety of female bracket portions. This determination has been made from the inquiries that have been made to the present inventor by various end users. These end users require that the bracket assembly tightly fit into the existing female bracket while having the ability for easy removal thereof after its use. The present invention provides such a bracket assembly and satisfies the identified need by providing a male portion of the wedge assembly that easily fits into the female wedge portion and securing itself in place by being selectively expanded by an expanding force. The male portion is removable from the female portion by removing or lessening the expanding force and allowing the male portion to contract or collapse.

SUMMARY OF THE INVENTION

The present invention may be briefly described as an expandable vibrator bracket for attaching a car-shaker vibrator to a female receptacle attached to a railroad car to be vibrated. The expandable bracket includes: a vibrator mounting member, a leg member, and a wedge base member. The vibrator mounting member is configured for supporting the vibrator. The wedge base member further includes a first end, a second end, a first side, and a second side. The wedge plate includes an attaching end, a distal end, an interior side and an exterior side. The attaching end is arrayed to be coupled to the first end of the wedge base member for allowing the distal end to selectively move with respect to the second end of the wedge base member when acted upon by at least one spreading member for providing a spreading or expanding force, wherein the second side of the wedge base member and the exterior side of the wedge plate simultaneously abut opposite interior surfaces of the female receptacle during selective urging by the spreading force for holding the expandable vibrator bracket in the female receptacle. Then the subsequent absence or reduction or removal of the spreading or expanding force allows for the removal of the expandable vibrator bracket from the female receptacle.

In addition to the above summary, the following disclosure is intended to be detailed to insure adequacy and aid in the understanding of the invention. However, this disclosure, showing particular embodiments of the invention, is not intended to describe each new inventive concept that may arise. These specific embodiments have been chosen to show at least one preferred or best mode for the expandable bracket assembly of the present invention. These specific embodiments, as shown in the accompanying drawings, may also include diagrammatic symbols for the purpose of illustration and understanding.

BRIEF DESCRIPTION OF THE DRAWING

FIG. 1 represents a side elevation of a first embodiment of the expandable bracket of the present invention. A female receptacle is depicted in dashed outline.

FIG. 2 represents a rear side elevation of the bracket of FIG. 1.

FIG. 3 represents a side elevation of a second embodiment of the expandable bracket of the present invention. The female receptacle is depicted in dashed outline.

FIG. 4 represents a rear side elevation of the bracket of FIG. 3.

FIG. 5 represents a side elevation of a third embodiment of the expandable bracket of the present invention. The female receptacle is depicted in dashed outline.

FIG. 6 represents a rear side elevation of the bracket of FIG. 5.

Figures 7, 8:
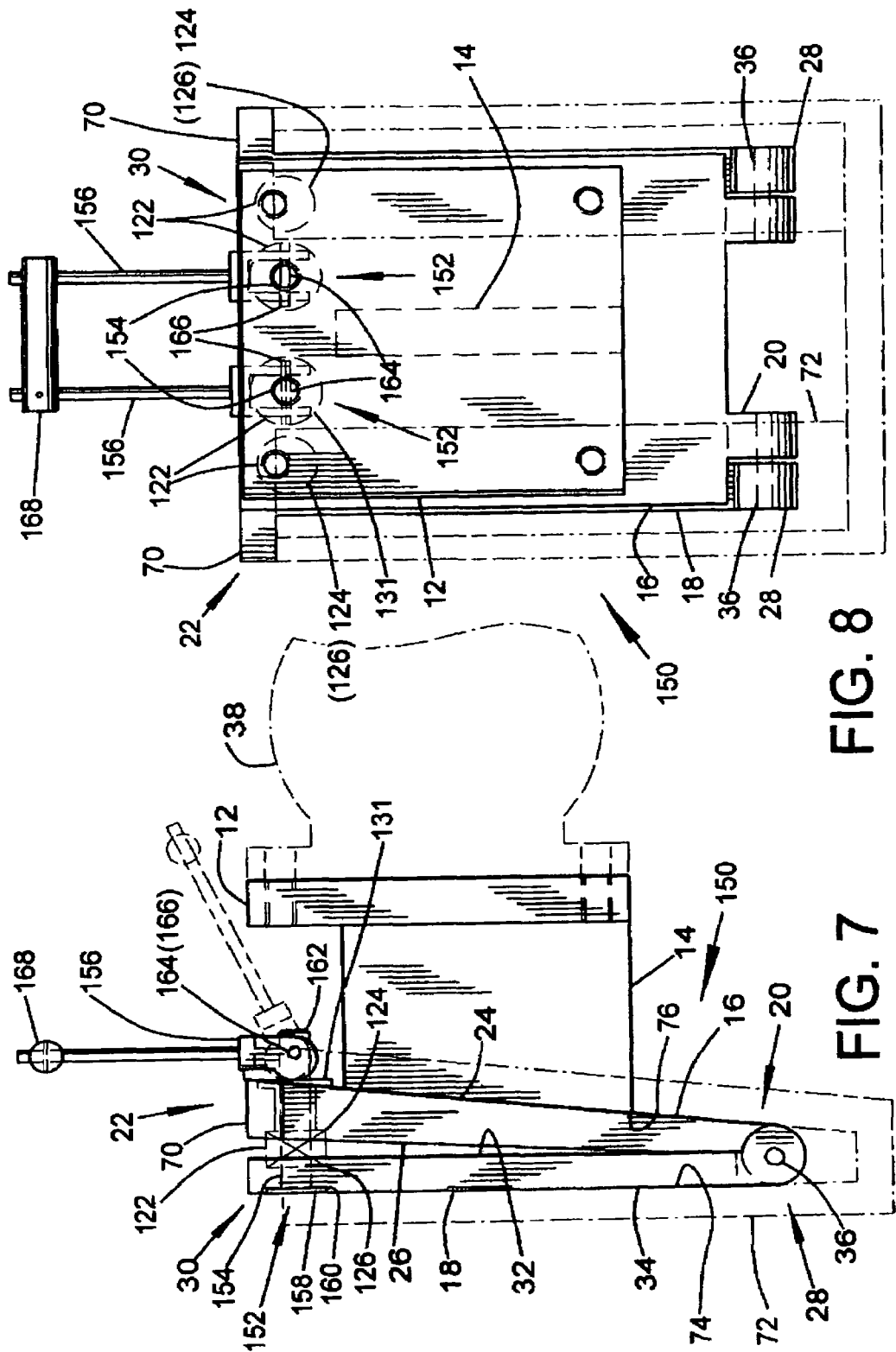
FIG. 7 represents a side elevation of a fourth embodiment of the expandable bracket of the present invention. The female receptacle is depicted in dashed outline.
FIG. 8 represents a rear side elevation of the bracket of FIG. 7.

In the following description and in the appended claims, various details or components are identified by specific names for convenience. These names are intended to be generic in their application while differentiating between those various details or components. The corresponding reference numbers refer to like members throughout the several figures of the drawing.

The drawings accompanying and forming a part of this specification disclose details of construction for the sole purpose of explanation. It is to be understood that structural details may be modified without departing from the concept and principles of the invention as claimed. This invention may be incorporated into other structural forms than shown.

DETAILED DESCRIPTION OF THE FIRST EMBODIMENT

Referring first to FIGS. 1 and 2 of the drawing, an expandable male bracket portion is generally identified as 10. The expandable male bracket 10 includes a vibrator mounting member 12, a leg member 14, a wedge base member 16, and a wedge plate 18. The vibrator mounting member 12, the leg member 14 and the wedge base member 16 may be either molded in one piece or securely fastened to each other by a suitable means such as by threaded fasteners, welding or the like. The wedge base member 16 includes a first end 20, a second end 22, a first side 24, and a second side 26. The wedge plate 18 includes an attaching end 28, a distal end 30, an interior side 32, and an exterior side 34.

The attaching end 28 is configured for coupling to the first end 20 in a hinged-like arrangement by means of a pair of hinge pins 36 for allowing the distal end 30 to move in an arc with respect to the second end 22 of the wedge base member 16. The hinge pins 36 may be of the pressed-in dowel type or a removable type that is not shown. One non-limiting example of a removable hinge pin 36 is a shoulder screw having a locking insert in its threaded portion so that it resists loosening during the operation of a vibrator 38 shown in dashed outline.

The expandable male bracket portion 10 further includes a spreader member 40 in the form of a wedge bar 42 that is employed to selectively move or separate the distal end 30 away from the second end 22 when inserted there between. The wedge bar 42 is moved linearly in a vertical direction by a lever 44. The one end 46 of the lever 44 is pivotally attached to the wedge bar 42 by and with a pivot pin 48 that slides in an elongated through aperture 50 in the lever 44. The lever 44 is mounted in a rectangular window 52 formed in a fulcrum block 54 by and with a fulcrum pin 56. It is preferred that at least one stop member 58 be provided for limiting the amount of separation between the distal end 30 and the second end 22. One non-limiting example of a stop member 58 is a threaded fastener 60 that has its head recessed in a counter-bore 62 in the wedge base member 16. An alternative stop member 64 may include at least one guide post 66 that has a biasing means 68 that is guided and retained under its enlarged head portion for urging the distal end 30 towards the second end 22 when the urging force of the spreader member 40 is either withdrawn or reduced or removed in a upward direction. One non-limiting example of a biasing means 68 is a commercially available compression spring. The threaded fastener 60 and the guide post 66 should include a nylon insert in its threaded portion for acting as a thread locking means.

It is to be noted that it is preferred that the wedge base member 16 have a pair of lug members 70 extending outwardly from its edges a selected distance. These lug members 70 limit the distance that the male bracket portion 10 will enter the female wedge bracket 72 in its contracted state by abutting a top edge of the female wedge member 72. The lug members 70 may be either formed as an integral part of the wedge base member 16, as shown, or alternatively the lug members 70 may be removably mounted thereto. One non-limiting example of a removable lug member 70 is a shoulder screw that is threaded into the edge of the wedge base member 16 and extends the selected distance for engaging the female wedge bracket 72. The wedge base member 16 may be pre-adjusted to an expanded condition to limit its entry distance into the female wedge bracket 72 should an operator manually remove the lug members 70.

In operation, the expandable male bracket portion 10 having an electrically, hydraulically, or pneumatically operated vibrator 38 removably secured thereto is inserted into the female wedge bracket 72 with its wedge bar 42 in the raised position with the lever 44 in the downward position, shown in dashed outline. The lug members 70 will limit the distance that the male bracket portion 10 is allowed to enter the female wedge bracket 72 by abutting or resting on its top edge. The lever 44 is rotated from the downward position in a counter-clockwise direction so that the wedge bar 42, acting as a separating member, is moved in a downward direction between the second side 26 of the wedge base member 16 and the interior side 32 of the wedge plate 18. This action causes the first side 24 of the wedge base member 16 and the exterior side 34 of the wedge plate 18 to simultaneously abut their adjacent interior surfaces 74 and 76 thereby providing a close fit between the male bracket portion 10 and the female wedge bracket 72 for effectively unloading the contents of the hopper car after the vibrator 38 is energized. After the hopper car is emptied to a sufficient point, the vibrator 38 is de-energized, subsequently the lever 44 is move clock-wise to its down position raising the wedge bar 42 for allowing the male bracket portion 10 to contract by moving the second end 22 and the distal end 30 toward each other. This contracted condition allows an operator to remove the male bracket 10 from the female wedge bracket 72. As noted above the lug members 70 aid in the removal process by positively limiting any unwanted dropping of the contracted male bracket portion 10 into the female wedge member 72. As also noted above, the use of the alternate stop member 64 will aid in the contraction of the male bracket portion 10.

DETAILED DESCRIPTION OF THE SECOND EMBODIMENT

Referring now in particular to FIGS. 3 and 4, the second embodiment of the expandable male bracket portion is generally identified as 90. This second embodiment of the expandable male bracket portion 90 is very similar to the expandable male bracket portion 10 and includes the vibrator mounting member 12, the leg member 14, the wedge base member 16, and the wedge plate 18 that are couple together as previously described above.

The second embodiment of the expandable male bracket portion 90 replaces the linear spreader member 40 with a rotary spreader member 92. The rotary spreader member 92 includes a disc member 94 that has at least one tapered face 96 forming a rotating wedge having a peripheral edge 114 that is thinner than its central or hub portion. The disc member 94 is removably mounted and retained to a shaft 98 in an eccentric fashion by and with suitable retaining means. One non-limiting example of a suitable retaining means is a standard key 100 and a pair of retaining rings 102. The shaft 98 is journalled in bearing block 104 that is removably attached to the wedge base member 16 by a plurality of suitable threaded fasteners 106. Retaining rings similar to retaining rings 102 are seated in grooves in the shaft 98 for limiting the axial movement between the shaft 98 and the bearing block 104. A handle 108 is mounted to the end of the shaft 98 that is distal to the end carrying the tapered disc member 94 for the selective rotation thereof between an expanding position and a contracting position. It is preferred that the amount of rotation of the shaft 98 be limited to 180 degrees by a suitable means such a pair of limit pins 110 projecting from the bearing block 104 and a stop pin 112 mounted transversely in the shaft 98. It is anticipated that the handle 108 may be replaced by a tool such as a wrench that engages at least one pair of wrench flats that may be formed on the end of the shaft 98.

In operation, the expandable male bracket portion 90 having a vibrator 38 removably secured thereto is inserted into a female wedge bracket 72 with its disc member 94 in a raised or insertion position, shown in dashed outline in FIG. 4. The previously described lug members 70, if employed, will limit the distance that the male bracket portion 90 is allowed to enter the female wedge bracket 72 by resting on its top edge. The handle 108 is rotated in a clock-wise direction so that the edge 114 of the disc member 94 is moved to the downward position as depicted in FIG. 3, between the second side 26 of the wedge base member 16 and the interior side 32 of the wedge plate 18. This causes the first side 24 of the wedge base member 16 and the exterior side 34 of the wedge plate 18 to simultaneously abut their adjacent interior surfaces 74 and 76 thereby providing a close fit between the male bracket portion 90 and the female wedge bracket 72 for unloading the contents of the hopper car after the vibrator 38 is energized. After the hopper car is emptied or the material is flowing freely, the vibrator 38 is de-energized, subsequently the handle 108 is move counter clock-wise thereby rotating the disc member 94 to its raised or insertion position allowing the male bracket portion 90 to contract by moving the second end 22 and the distal end 30 toward each other. This contracted condition allows an operator to remove the male bracket 10 from the female wedge bracket 72. As previously noted the lug members 70 aid in the removal process by limiting unwanted jamming of the collapsed male bracket portion 10 with the female wedge member 72. As also previously noted the use of the alternate stop member 64 will also aid in the contraction of the male bracket portion 10.

DETAILED DESCRIPTION OF THE THIRD EMBODIMENT

Referring now in particular to FIGS. 5 and 6, the third embodiment of the expandable male bracket portion is generally identified as 120. This third embodiment of the expandable male bracket portion 120 is very similar to the expandable male bracket portion 10 and/or 90 in that it includes the vibrator mounting member 12, the leg member 14, the wedge base member 16, and the wedge plate 18 that are couple together as described above in the first embodiment. The primary difference between this expandable male bracket portion 120 and the previously described male bracket portion 10 and/or the male bracket portion 90 is that the spreader member is in the form of at least one biasing member 122 that is mounted between the wedge base member 16 and the wedge plate 18. Some non-limiting examples of a biasing member 122 are a heavy-duty compression spring, a die spring, urethane compression spring and the like. One end of each biasing member 122 should be seated in a pocket or counter-bore 124 in the wedge base member 16 and its other end should be in a wedge plate counter-bore 126. The type and quantity of the biasing members 122 may be determined by the total compressive force needed to hold the expandable male bracket portion 120 in the female bracket 72 while the vibrator 38 is in operation. It is also preferred that the male bracket portion 120 include at least one expansion limiter assembly 128 that is adjustable so that the ends of the biasing members 122 will be retained in the wedge base member counter-bores 124 and the wedge plate counter-bores 126 when the male portion 120 is not positioned in the female bracket 72. The wedge base member 16 may include a pair of lug members 70 similar to those previously described. The expansion limiter assembly 128 preferably includes a threaded stud member 129 and a hex nut 130 and a heavy-duty flat washer 131. It is anticipated that a wrench may be used on the adjusting nut 130 to compress the biasing members 122 and draw the wedge plate 18 towards the wedge base member 16 before removing the contracted male bracket portion 120 from the female bracket 72.

However, it is preferred that a separate contracting device 132 be employed for compressing the biasing members 122 prior to the removal of the male bracket portion 120 from the female bracket portion 72. The contracting device 132 should also be of the quick acting type. One non-limiting example of such a contracting device 132 is a toggle type of mechanism such as a commercially available draw latch. It is preferred that the contracting device 132 has an adjustable latching rod 134. The contracting device 132 is removably fastened to the second end 22 of the wedge base member 16 and/or a top edge of the leg member 14 by a suitable means. The latching rod 134 engages a post 136 that is removable fastened to the distal end 30 of the wedge plate 18.

In operation, the expandable male bracket portion 120 having a vibrator 38 removably secured thereto is inserted into a female wedge bracket 72 with a lever 138 of the contracting device 132 in its down position. This down position, shown in FIG. 5 in solid outline, provides engagement of the latching rod 134 with the post 136 for compressing the biasing members 122. The preferred lug members 70 will limit the distance that the male bracket portion 120 is allowed to enter the female wedge bracket 72 by resting on its top edge. The lever 138 is rotated in a counter clock-wise direction to the raised position for disengaging the latching rod 134 from the post as shown in FIG. 5, as a dashed outline. The spreading force of the biasing members 122 causes the first side 24 of the wedge base member 16 and the exterior side 34 of the wedge plate 18 to simultaneously abut their adjacent interior surfaces 74 and 76 thereby providing a close fit between the male bracket portion 120 and the female wedge bracket 72 for unloading the contents of the hopper car after the vibrator 38 is energized. After the hopper car is emptied to a sufficient point, the vibrator 38 is de-energized, subsequently the lever 138 is moved clock-wise to its lowered position with the latching rod 134 re-engaging the post 136 and compressing the biasing member 122 thereby allowing the male bracket portion 120 to contract by moving the second end 22 toward the distal end 30. This contracted condition allows an operator to remove the male bracket 120 from the female wedge bracket 72. The lug members 70, if used, will also aid in the removal process.

DETAILED DESCRIPTION OF THE FOURTH EMBODIMENT

Referring now in particular to FIGS. 7 and 8, the fourth embodiment of the expandable male bracket portion is generally identified as 150. This fourth embodiment of the expandable male bracket portion 150 is very similar to the expandable male bracket portion 120 in that it includes the vibrator mounting member 12, the leg member 14, the wedge base member 16, and the wedge plate 18. The wedge base member 16 and the wedge plate 18 are coupled together as described above in the first embodiment 10. Similar to the third embodiment 120, the wedge base member 16 and the wedge plate member 18 are urged apart by the spreader member in the form of at least one biasing member 122. The type, number and mounting of the biasing members 122 are described above in connection with the third embodiment 120.

The main difference between the fourth embodiment 150 and the third embodiment 120 of expandable male bracket assemblies is in the expansion limiter assembly. Each expansion limiter assembly 152 of the fourth embodiment 150 is also a contracting device and preferably includes a stud member 154, the biasing member 122, a heavy-duty flat washer 131 and a double cam member 156. The double cam may be selected from standard type tooling components that are commercially available or may be custom made for providing the desired amount of compression of the biasing members 122. One end 158 of the stud member 154 is enlarged and resides in a recess 160 of the wedge plate 18. The other end 162 of the stud member 154 includes a transverse through aperture 164 for mounting the double cam member 156 thereto in a pivoting manner by and with a retaining pin 166. A tie member 168 may be provided between two expansion limiter assemblies 152 and used as a handle for moving both double cam members simultaneously.

When the expansion limiter assembly 152 acts as a contracting device it compresses the biasing members 122 prior to the removal of the male bracket portion 150 from the female bracket portion 72. The contracting device 152 is also quick acting. When the double cam member 156 is in the contracting position, shown in dashed outline in FIG. 7, the wedge plate 18 is pivoted towards the wedge base member 16 and compresses the biasing means 122. When the double cam member 156 is moved counter-clockwise from the contracting position to its expansion limiter position shown in solid outline the biasing means 122 applies pressure and urges the wedge plate 18 away from the wedge base member 16 for expanding the male bracket portion 150 to fit tightly into the female bracket 72.

In operation, the expandable male bracket portion 150 having a vibrator 38 removably secured thereto is inserted into a female wedge bracket 72 with the double cam member 156 of the expansion limiter and contracting device 152 in its dashed outline position. This dashed outline position compresses the biasing members 122 by a cam action. The lug members 70 rest on the top edge of the female wedge bracket 72 for limiting the distance that the male bracket portion 150 is allowed to enter. The double cam member 156 is rotated in a counter clock-wise direction to a raised position shown in solid outline. The spreading force of the biasing members 122 cause the first side 24 of the wedge base member 16 and the exterior side 34 of the wedge plate 18 to simultaneously abut their adjacent interior surfaces 74 and 76 thereby providing a close fit between the male bracket portion 150 and the female wedge bracket 72 for unloading the contents of the hopper car after the vibrator 38 is energized. After the hopper car is sufficiently emptied, the vibrator 38 is de-energized. Subsequently the double cam member 156 is move clock-wise to its lowered position (dashed outline) compressing the biasing member 122 thereby allowing the male bracket portion 150 to contract by moving the second end 22 toward the distal end 30. This contracted condition allows an operator to remove the male bracket 150 from the female wedge bracket 72. The lugs 70 limit the jamming of the male bracket 150 into the bracket 72

It is anticipated that the biasing means 122 may further include expandable chamber devices when pneumatic or hydraulic vibrators are used.

What is claimed is:

1. An expandable vibrator bracket for attaching a vibrator to a female receptacle attached to a railroad car to be vibrated, said expandable bracket including:
    a) a vibrator mounting member, a leg member, and a wedge base member, the vibrator mounting member being configured for supporting the vibrator, the wedge base member having a first end, a second end, a first side, and a second side;
    b) a wedge plate having an attaching end, a distal end, an interior side and an exterior side, the attaching end being coupled to the first end of the wedge base member for allowing the distal end to selectively move with respect to the second end of the wedge base member when acted upon by at least one spreader member, and
    c) wherein the second side of the wedge base member and the exterior side of the wedge plate simultaneously abut opposite interior surfaces of the female receptacle during selective urging by the at least one spreader member for holding the expandable vibrator bracket in the female receptacle and removal of the selective urging by the spreader member allowing removal of the expandable vibrator bracket from the female receptacle.

2. An expandable vibrator bracket as recited in claim 1 wherein the at least one spreader member is a wedge bar that is moved in a linear direction between the distal end and the second end.

3. An expandable vibrator bracket as recited in claim 1 wherein the at least one spreader member is a disc member that is eccentrically mounted on a shaft member that is journalled to the wedge base member, the disc member further includes at least one tapered face; wherein manual and selective rotation of the disc member and the shaft moves the tapered face in between the distal end and the second end.

4. An expandable vibrator bracket as recited in claim 1 which further includes a stop member for limiting the amount of separation of the distal end with respect to the second end.

5. An expandable vibrator bracket as recited in claim 2 which further includes a stop member for limiting the amount of separation of the distal end with respect to the second end.

6. An expandable vibrator bracket as recited in claim 3 which further includes a stop member for limiting the amount of separation of the distal end with respect to the second end.

7. An expandable vibrator bracket as recited in claim 4 wherein the stop member further includes a biasing means for moving the distal end towards the second end when the urging force of the spreader member is removed.

8. An expandable vibrator bracket as recited in claim 1 wherein the wedge base member further includes a pair of lug members that extend outwardly a selected distance from opposed edges of the second end for abutting a top edge of the female receptacle for limiting a distance of entry thereof.

9. An expandable vibrator bracket as recited in claim 2 wherein the wedge base member further includes a pair of lug members that extend outwardly a selected distance from opposed edges of the second end for abutting a top edge of the female receptacle for limiting a distance of entry thereof.

10. An expandable vibrator bracket as recited in claim 3 wherein the wedge base member further includes a pair of lug members that extend outwardly a selected distance from opposed edges of the second end for abutting a top edge of the female receptacle for limiting a distance of entry thereof.

11. An expandable vibrator bracket as recited in claim 1 wherein the each spreader member is a biasing member that is mounted between the wedge base member and the wedge plate.

12. An expandable vibrator bracket as recited in claim 11 which further includes an expansion limiter assembly for maintaining engagement of the biasing means between the wedge base member and the wedge plate.

13. An expandable vibrator bracket as recited in claim 11 that further includes a contracting device for compressing the biasing members prior to removal of the expandable vibrator bracket from the female receptacle.

14. An expandable vibrator bracket as recited in claim 12 that further includes a contracting device for compressing the biasing members prior to removal of the expandable vibrator bracket from the female receptacle.

15. An expandable vibrator bracket as recited in claim 13 wherein the contracting device is a toggle type mechanism that is adjustable for controlling the amount of compressing of the biasing members.

16. An expandable vibrator bracket as recited in claim 14 wherein the contracting device is a toggle type mechanism that is adjustable for controlling the amount of compressing of the biasing members.

17. An expandable vibrator bracket as recited in claim 12 wherein a cam assembly is pivotally attached to the wedge base member and acts as the expansion limiter assembly when manually placed in an expansion limiting position and subsequently acts a contracting device when manually placed in a contracting position.

18. An expandable vibrator bracket as recited in claim 11 wherein the wedge base member further includes a pair of lug members that extend outwardly a selected distance from opposed edges of the second end for abutting a top edge of the female receptacle for limiting a distance of entry thereof.

19. An expandable vibrator bracket as recited in claim 12 wherein the wedge base member further includes a pair of lug members that extend outwardly a selected distance from opposed edges of the second end for abutting a top edge of the female receptacle for limiting a distance of entry thereof.

20. An expandable vibrator bracket as recited in claim 13 wherein the wedge base member further includes a pair of lug members that extend outwardly a selected distance from opposed edges of the second end for abutting a top edge of the female receptacle for limiting a distance of entry thereof.

* * * * *